United States Patent [19]
Fletcher

[11] Patent Number: 5,593,609
[45] Date of Patent: Jan. 14, 1997

[54] MIXING DEVICE FOR A MICROWAVE OVEN

[76] Inventor: David J. Fletcher, 18 Lovell Rd., Cambridge, CB4 2QR, United Kingdom

[21] Appl. No.: 490,897

[22] Filed: Jun. 16, 1995

[30] Foreign Application Priority Data

Jun. 15, 1994 [GB] United Kingdom ............ 9411971

[51] Int. Cl.⁶ .................................................. H05B 6/78
[52] U.S. Cl. ...................... 219/726; 219/754; 366/208; 99/443 R; 108/20
[58] Field of Search ........................... 219/726, 754, 219/755; 108/20; 366/208, 213, 217; 99/348, 443 R, DIG. 14

[56] References Cited

U.S. PATENT DOCUMENTS

| | | | |
|---|---|---|---|
| 4,219,715 | 8/1980 | Mandle et al. | 219/755 |
| 4,258,630 | 3/1981 | Jorgensen et al. | 219/755 |
| 4,330,696 | 5/1982 | Pomeroy et al. | 219/755 |
| 4,424,431 | 1/1984 | Gurubatham | 219/754 |
| 4,631,379 | 12/1986 | Aoyama | 219/754 |
| 4,751,357 | 6/1988 | Boulard | 219/726 |
| 4,808,781 | 2/1989 | Liu | 219/10.55 F |
| 5,229,565 | 7/1993 | Pressouyre | 219/754 |
| 5,511,879 | 4/1996 | Fletcher | 366/208 |

FOREIGN PATENT DOCUMENTS

| | | |
|---|---|---|
| 2178278 | 11/1985 | United Kingdom . |
| 2271045 | 3/1994 | United Kingdom ............ 219/754 |

*Primary Examiner*—Philip H. Leung
*Attorney, Agent, or Firm*—Anthony F. Cuoco; Lawrence G. Fridman

[57] ABSTRACT

A mixing device for a microwave oven consists of upper and lower elements. A multiplicity of bearing members is provided therebetween. Each of these elements is formed with at least one surface and a plurality of individual separated from each other bearing cups. Each bearing cup has a limited receiving area for receiving the corresponding bearing member. Each receiving area is larger than the largest outside periphery of the corresponding bearing member. In an assembled condition of the mixing device, the surfaces of the upper and lower elements face each other so that the receiving areas of the upper element are substantially aligned with the corresponding receiving areas of the lower element forming a plurality of bearing couples. Each bearing couple accommodates free movement of the corresponding bearing element. Upon rotation of the driving rod, the upper element undergoes orbital motion relative to the lower element.

10 Claims, 5 Drawing Sheets

MIXING DEVICE FOR A MICROWAVE OVEN

The present invention relates to a powered mixing device for use in a microwave oven and, more particularly, but not exclusively, the present invention relates to an orbital or reciprocal shaking device for use in a microwave oven.

A problem associated with microwave ovens is that the spatial distribution of the microwave energy in the oven cavity tends to be non-uniform. As a result, "hot spots" and "cold spots" may be produced at different locations within the oven cavity. This can lead to unsatisfactory heating or cooking results.

Many microwave ovens include a rotating plate on which the goods to be heated may be placed. During the cooking mode, the rotating plate turns thereby moving the goods to be heated through the microwave field within the oven cavity. The use of such a rotating plate helps to alleviate the problem of uneven heating of the food, however, the plate rotates slowly and does not impart any mixing action on the material being heated. The lack of mixing on liquids, semi-liquids or on foods having a high liquid content, e.g. stews or casseroles, can have detrimental results. Super-heating can occur in places with consequent spoiling of the foodstuff or boiling over. Defrosting liquids such as low fat milk in a microwave present such a problem.

Cooking instructions for goods to be cooked or heated in a microwave oven often specify that the particular foodstuff should be stirred at least once during the heating process and thus it is necessary to stop the cooking process, remove the foodstuff from the oven, stir it and then put the foodstuff back in the oven for resumption of the cooking process. This is time-consuming and the interrupted cooking process may allow the temperature of the foodstuff to drop, which is not desirable.

It is hence an object of the present invention to ameliorate the aforementioned problems by providing a powered stirring or mixing attachment for a microwave oven, thereby allowing improved heating of liquids, semi-liquids and foodstuffs containing a significant amount of liquid.

It is another object of the present invention to provide a powered mixing device adapted for use in a microwave oven that is suitable for use with any microwave-safe vessel.

It is a further object of the present invention to provide a microwave oven having an integral powered mixing device, in particular a powered orbital shaking or reciprocal shaking device.

According to the present invention, there is provided a powered mixing device adapted for use in a microwave oven characterized in that the said mixing device comprises a base element and an outer element superimposed thereon to support a vessel containing the material to be heated and mixed and further comprising support means adapted to allow movement of the outer element relative to the base element and wherein drive means are provided through which said outer element is driven the arrangement being such that movement of the outer element is effected by actuation of the drive means.

Accordingly when a vessel containing material to be heated and agitated is placed upon the outer element and the drive means is actuated the motion of the outer element acts upon the contents of the vessel thereby mixing them.

In some embodiments, the drive means for the outer element may be driven by coupling to the movement of the rotating plate of the microwave oven.

In further embodiments, the drive means for the outer element may be driven by an integral power source contained within the base element.

The mixing device can be used as an attachment for a microwave oven or alternatively it can be a permanent component of the microwave oven.

By use of a mixing device of the present invention, liquids, semi-liquids or foods containing a significant quantity of liquid can be simultaneously heated and mixed during the heating process, thereby promoting even heat conduction throughout the material being heated. This can help to keep the foodstuff at the right consistency and can also prevent the formation of "hot spots" which reduces the likelihood of boiling over or spoiling of the material or foodstuff.

Furthermore the present invention has the additional advantage that it can be used with virtually any vessel that is microwave safe. There is no need for specially designed vessels. Moreover, no part of the mixing device contacts the material being heated and this avoids the need to wash stirrers or paddles etc.

In a preferred embodiment, the support means comprises rolling contact bearings accommodated within seatings formed by alignment of corresponding formations located on opposing surfaces of the base element and the outer element. Preferably, spherical rolling contact bearings could be used to impart orbital movement of the outer element relative to the base element.

In alternative embodiments, the support means could comprise resilient members or spring means.

Typically, the outer element and the base element will be plates but it will be understood that they could comprise frame members, provided that they are capable of fulfilling their function. The outer element may be provided with means for receiving and retaining the vessels containing the foodstuffs to be mixed and such means could comprise a non-slip mat or adjustable arms.

Preferably, the drive means is provided with a gearing system through which said outer element may be driven by the actuating means.

Preferably, the base element of the mixing device is releasably secured to the base of the microwave oven by fixing means.

In a further alternative embodiment, the support means may comprise wheel means or roller means which are connectable to the outer element and which are accommodated within seatings formed on the upper surface of the base element. Such wheel means or roller means with suitable drive means could be used to impart reciprocating movement of the outer element relative to the base element.

It will be understood by a person skilled in the art that the number, size and arrangement of the support means can be varied to accommodate different dimensions, load capabilities or degrees of relative movement between the base plate and outer plate, e.g. different orbiting excursions or reciprocating excursions.

Typically, the external parts of the mixing device are constructed of microwave-safe plastics materials such as acrylic.

In the case of embodiments incorporating an integral power unit, e.g. an electric motor and a battery power supply, there is provided shielding means to protect the metal working parts from exposure to the microwaves within the oven cavity.

Embodiments of the invention will now be described, by way of example only, with reference to the accompanying illustrative Drawings, in which.

Figure 1:
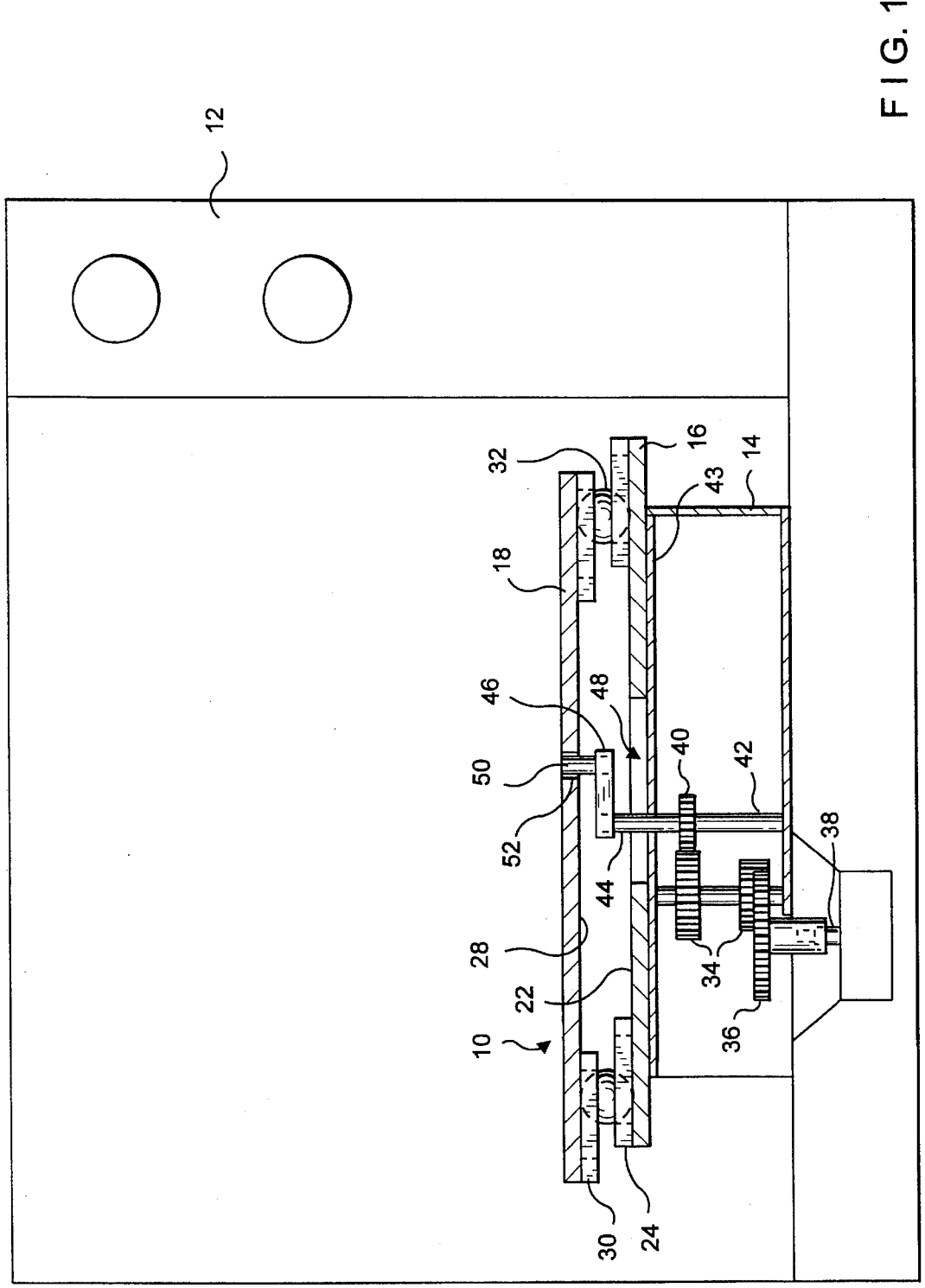
FIG. 1 shows a partially-sectional view of a mixing device and a microwave oven constructed in accordance with a preferred embodiment of the invention.
Figure 2:
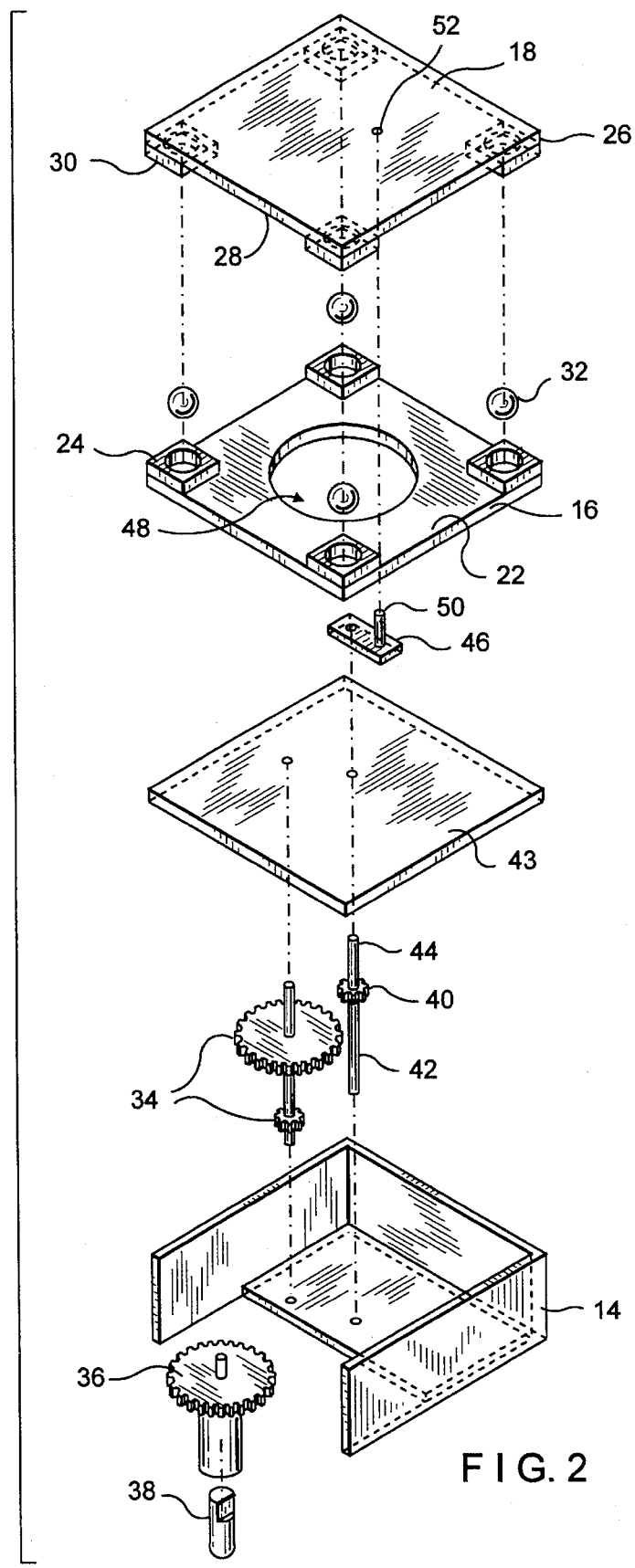
FIG. 2 shows an exploded perspective view of the mixing device shown in FIG. 1.

Referring to FIGS. 1 and 2, there is shown a mixing device 10 for use in a microwave oven 12. The mixing device 10 comprises a base element 14 and an outer element or plate 18. The base element 14 includes a base plate 16. The base plate 16 and the outer element 18 are arranged in parallel with respect to each other. At each of the corners of the top surface 22 of the base plate 16 there is provided a support means 24 which in this embodiment comprises a bearing cup. At each of the corners 26 of the underside 28 of the outer plate 18, there is provided a corresponding support means 30. The support means 24 and the corresponding support means 30 are positioned in vertical alignment at each corner of the opposing surfaces 22,28 such that a rolling contact bearing or ball bearing 32 can be accommodated between each pair. The rolling contact bearings 32 are dimensioned so that they can move freely within each matched pair of bearing cups, thereby allowing the outer plate 18 to undergo orbital motion in its own plane relative to the stationary base plate 16. Accordingly, the outer plate 18 is spaced apart from the base plate 16 by the four rolling contact bearings 32.

As shown in FIG. 2, the base element 14 houses a system of interconnected gear wheels 34. A first gear wheel 36, the input gear, is mounted so that it can be coupled to the microwave oven motor drive spindle 38. The input gear wheel 36 is arranged in meshing engagement with the system of interconnecting gear wheels 34. The final gear wheel 40 of the system of gear wheels 34 is carried on an output driving rod 42. The upper end 44 of the output driving rod 42 protrudes from the top surface 43 of the base structure 14 and carries an output crank shaft 46. The base plate 16 is disposed on the top surface 43 of the base structure 14 and is provided with a central aperture 48 which is dimensioned to receive the output driving rod 42 and the output crank shaft 46 and to accommodate the travel described by the output crank shaft 46 when the device is in use.

The upper end 50 of the output crank shaft 46 is releasibly connected to the outer plate 18 which is located above the base plate 16 and arranged in parallel thereto. The outer plate 18 is provided with an aperture or slot 52 which is positioned to receive and accommodate the upper end 50 of the output crank shaft 46.

In order to operate the mixing device 10, the base element 14 and the base plate 16 are positioned within the oven cavity so that the input gear wheel 36 may be coupled to the microwave oven motor drive spindle 38. The base element 14 may be releasably secured to the base of the oven cavity by fixing means (not shown) such as screws or brackets or the like. Each of the four rolling contact bearings or ball bearings 32 is positioned on each of the four support means or bearing cups 24 arranged at each corner of the top side 22 of the base plate 16. The outer plate 18 is then lowered onto the base element assembly so that the corresponding support means or bearing cups 30 located at each corner 26 of the underside 28 of the outer plate 18 are in exact vertical alignment with the support means 24 on the base plate 16 with the four rolling contact bearings or ball bearings 32 accommodated therebetween. At the same time, the output crank shaft 46 is located in the aperture or slot 52 of the outer plate 18.

When the electric motor means of the microwave oven 1 is activated, the driving spindle 38 rotates. The input gear wheel 36 is coupled to the drive spindle 38 and thus also rotates. Rotation of the input gear wheel 36 in turn drives the system of interconnecting gear wheels 34, the final gear wheel 40, the output driving rod 42 and the output crank shaft 46. Eccentric rotation of the crank shaft 46 causes the outer plate 18 to undergo orbital movement in its own plane relative to the stationary base plate 16. The path of the orbital motion is determined by the ball bearings running in the paired bearing cups.

The gears system serves to provide an appropriate output drive shaft speed for effecting orbital motion of the outer plate 18.

A vessel (not shown) containing material to be agitated may be placed on the outer plate 18. Although not depicted in the Drawings, the outer plate 18 may be provided with means to secure the vessel to the plate, for example a non-slip mat or adjustable arms. The cyclic motion of the outer plate 18 acts upon the liquid, semi-liquid or food containing a significant proportion of liquid in the vessel to produce a swirling motion thereby mixing the contents.

Figure 3:
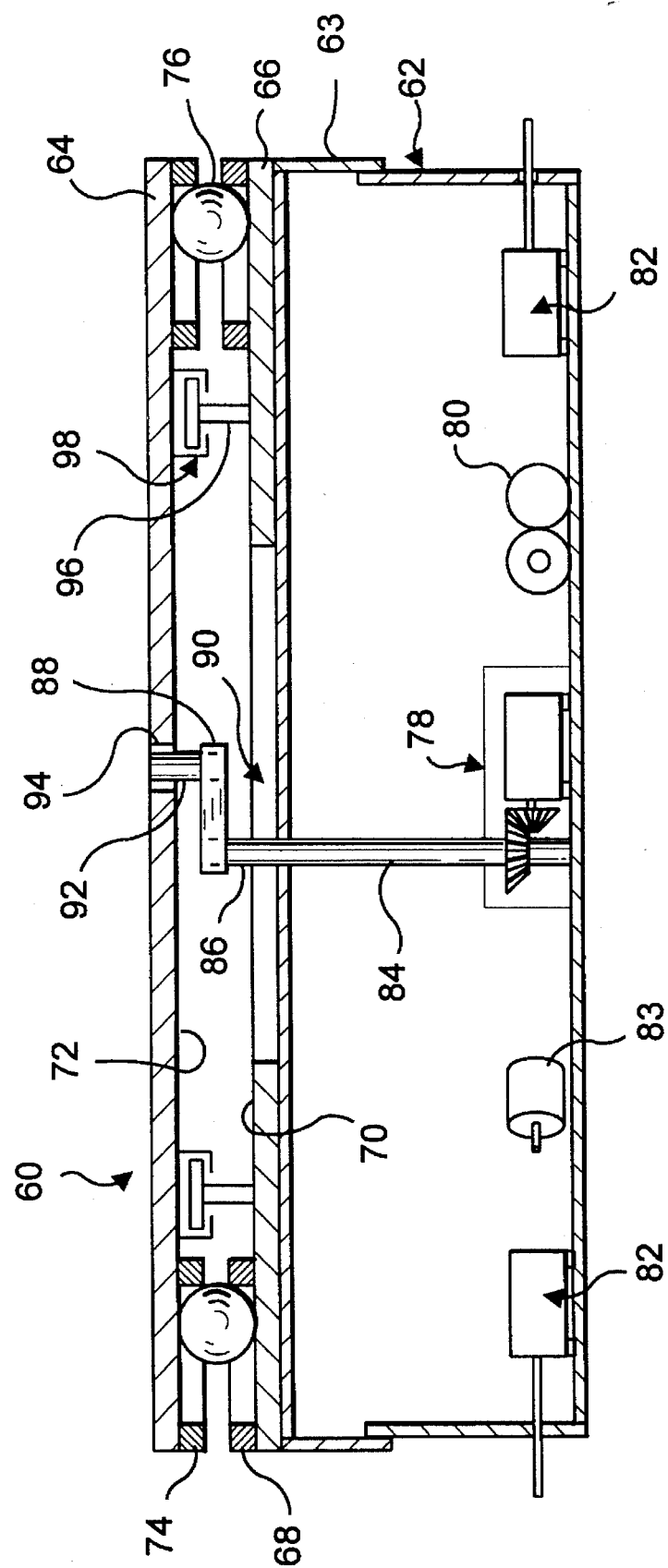
FIG. 3 shows a partially-sectional view of a mixing device constructed in accordance with an alternative embodiment of the invention.
Figure 4:
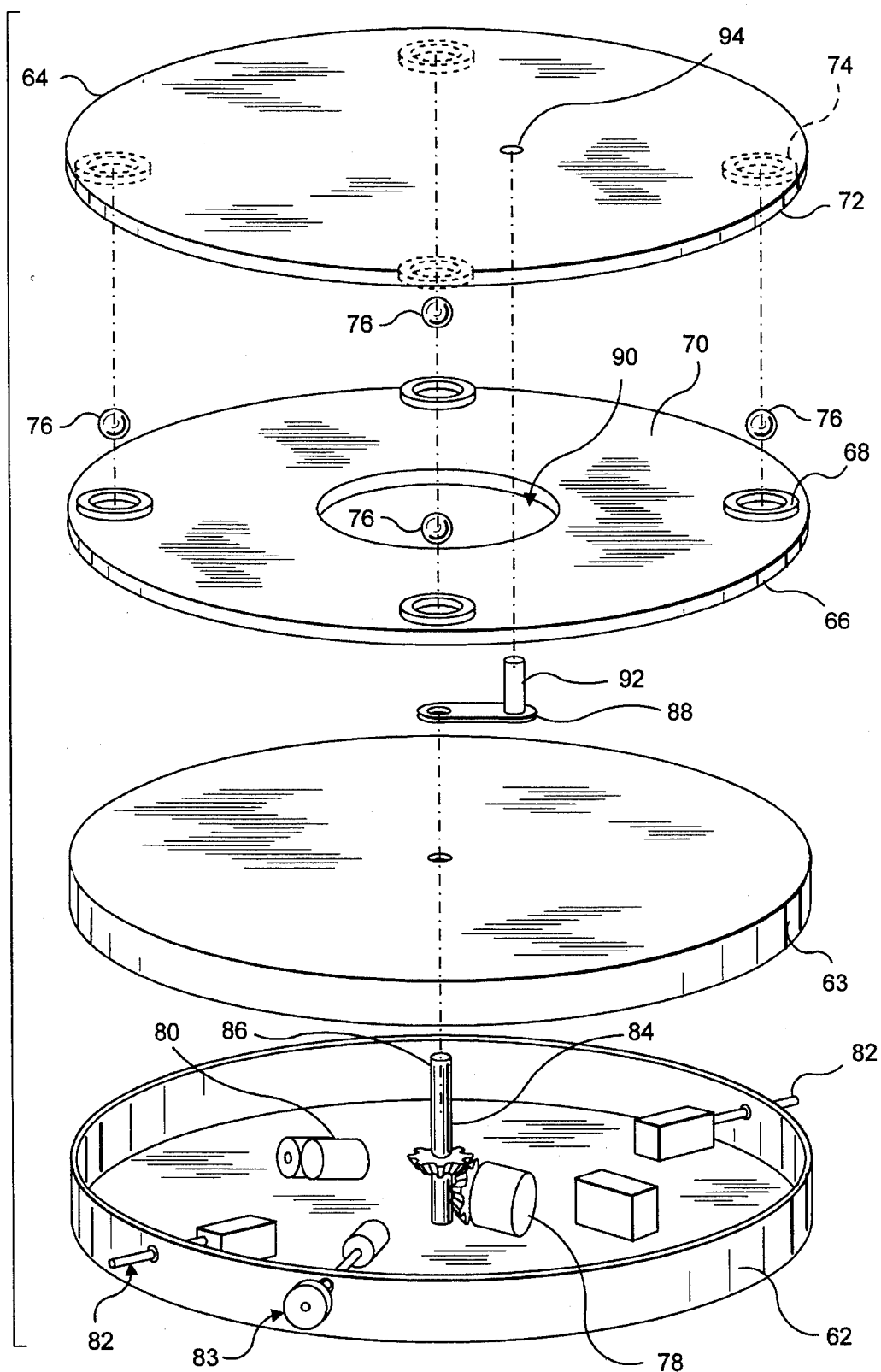
FIG. 4 shows an exploded perspective view of the embodiment shown in FIG. 3.

Referring to FIGS. 3 and 4, there is shown another embodiment of a mixing device for use in a microwave oven. The mixing device 60 comprises a base element 62 and an outer element or plate 64. The base element 62 includes a top cover 63 and a base plate 66. The base plate 66 and the outer element 64 are arranged in parallel with respect to each other.

Support means 68 are arranged around the periphery of the top surface 70 of the base plate 66. In this embodiment, the support means 68 comprise a bearing cup. Around the periphery of the underside 72 of the outer plate 64, there is provided corresponding support means 74. The support means 68 and corresponding support means 74 are positioned in vertical alignment around the peripheries of the opposing surfaces 70 and 72, such that a rolling contact bearing or ball bearing 76 can be accommodated between each pair. The rolling contact bearings 76 are dimensioned so that they can move freely within each matched pair of bearing cups, thereby allowing the outer plate 64 to undergo orbital motion in its own plane relative to the stationary base plate 66. Accordingly, the outer plate 64 is spaced apart from the base plate 66 by the rolling contact bearings 76.

As shown in FIG. 3, the base element 62 houses an electric motor 78 and a battery power supply 80 that allow the mixing device to operate independently of the microwave oven drive. Accordingly, this embodiment may be used in a microwave oven regardless of whether the microwave oven incorporates a rotating plate.

In a microwave oven having no rotating plate, the mixing device 10 may stand on the base of the oven cavity. In microwave ovens incorporating a rotating plate, the mixing device may stand on the plate so that the foodstuffs to be heated are rotated and mixed simultaneously. Alternatively, the base element 62 may be provided with feet (not shown) which may raise the base element of the mixing device clear above the rotating plate so that the plate may rotate but the mixing device does not.

The base assembly 62 and 63 is provided with shielding means to protect the power unit within from exposure to microwaves distributed within the oven cavity. If no such shielding means are provided, arcing may occur from the metallic parts which may damage both the mixing device and the microwave oven.

Typically, the base element 62 and top cover 63 may be a metallic box structure provided with a microwave-safe or microwave reflective exterior layer or coating, for example an electrically-insulating paint finish. It will be understood however that the base assembly could comprise a box of microwave-safe material with a metallic interior coating or alternatively that the base assembly could comprise a laminate material, provided that the base assembly is capable of fulfilling its function of shielding the contents from the microwave energy within the oven cavity.

The power unit housed within the base element 62 may comprise a direct current electric motor 78 with an associated gearing system, batteries 80, switches 82, speed control means 83 and a power regulator. All of the external parts of the switches and controls are made of microwave-safe materials and the apertures in the base element and top cover walls from which they protrude are made as small as possible in order to limit or preclude entry of microwaves.

Two on/off push switches 82 are provided arranged at 180° with respect to each other. This arrangement ensures that when the mixing device is used in an oven with a rotating plate, a switch should always be accessible from the door position whenever the rotating plate stops moving.

As shown in FIG. 3, the electric motor 78 is coupled to an output driving rod 84. The upper end 86 of the output driving rod 84 protrudes from the top cover 63 of the base element 62 and carries an output crank shaft 88. The base plate 66 is disposed on the top surface of the top cover 63 and is provided with a central aperture 90 which is dimensioned to receive the output driving rod 84 and the output crank shaft 88 and to accommodate the travel described by the output crank shaft 88 when the device is in use.

The upper end 92 of the output crank shaft 88 is releasibly connected to the outer plate 64 which is located above the base plate 66 and arranged in parallel thereto. The outer plate 64 is provided with an aperture or slot 94 which is positioned to receive and accommodate the upper end of the output crank shaft 92.

The base element 66 is provided on an upper surface 70 thereof with at least one fixing element 96. The lower surface 72 of the outer plate 64 is provided with a corresponding formation 98 which is capable of cooperating with the fixing element 96. The engagement between the fixing means 96 and the corresponding formation 98 is such that the top plate is able to undergo orbital movement in its own plane relative to the stationary base plate 66, but, by virtue of the fixing element 96 being held captive in the corresponding formation 98, the outer plate 64 may not be unintentionally removed.

In order to operate the mixing device 60, the base structure 62 and the base plate 66 are positioned within the oven cavity. Each of the rolling contact bearings or ball bearings 76 is positioned on the respective support means or bearing cups 68 arranged around the periphery of the top side 70 of the base plate 66. The outer plate 64 is then lowered onto the base element assembly so that the corresponding support means or bearing cups 74 located around the periphery of the underside 72 of the outer plate 64 are in exact vertical alignment with the support means 68 on the upper surface 70 of the base plate 66 with the rolling contact bearings or ball bearings 76 accommodated therebetween. At the same time, the fixing means 96 are accommodated within the corresponding formations 98 so that the top plate 64 is secured to the base plate 66 and the output crank shaft 88 is located in the aperture or slot 94 of the outer plate 64.

When the power unit of the base structure 62 is activated, the output driving rod 84 rotates. This causes eccentric rotation of the crank shaft 88 which in turn causes the outer plate 64 to undergo orbital movement in its own plane relative to the stationary base plate 66. The path of the orbital motion is determined by the ball bearings running in the paired bearing cups.

A gear system (not shown) may be provided to allow an appropriate output drive rod speed to be selected for effecting orbital motion of the outer plate 64.

A vessel (not shown) containing material to be agitated may be placed on the outer plate 64. Although not depicted in the Drawings, the outer plate 64 may be provided with means to secure the vessel to the plate, for example a non-slip mat or an arrangement of adjustable arms. The cyclic motion of the outer plate 18 acts upon the liquid, semi-liquid or food containing a significant proportion of liquid in the vessel and produces a swirling motion, thereby mixing the contents.

Figure 5:
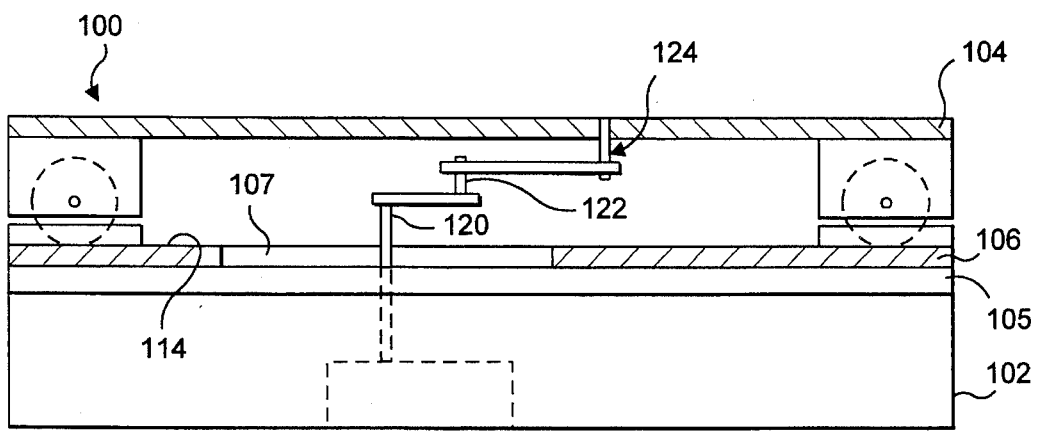
FIG. 5 shows a partially sectional view of a mixing device constructed in accordance with a further alternative embodiment of the invention.
Figure 6:
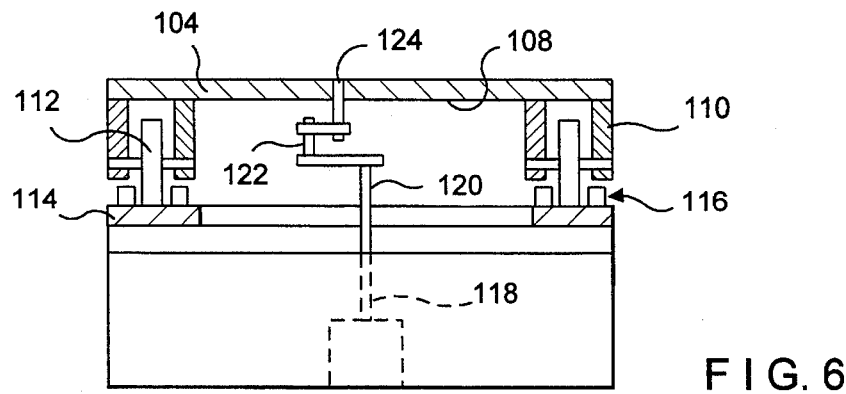
FIG. 6 shows an end view of the embodiment shown in FIG. 5.
Figure 7:
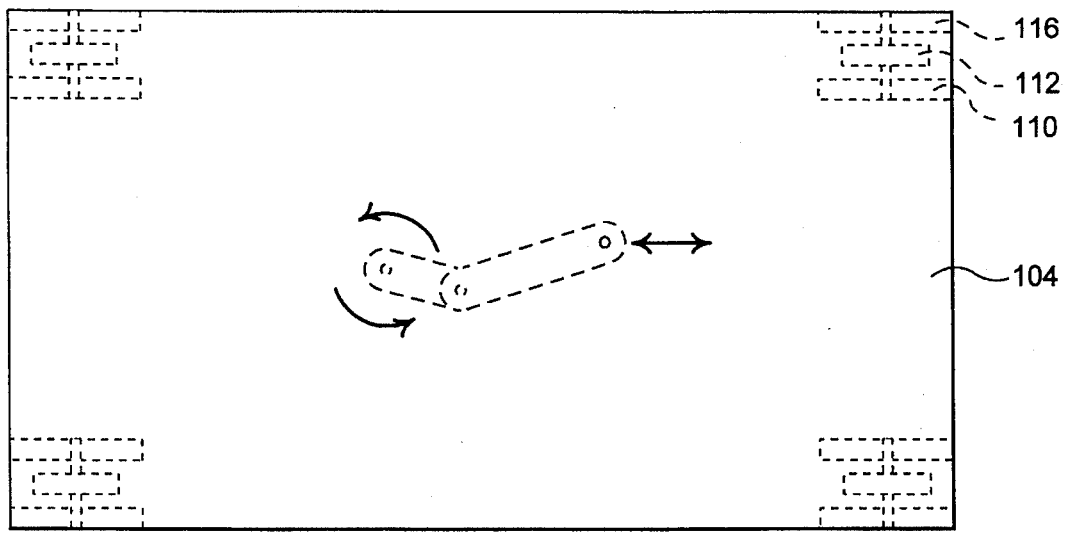
FIG. 7 shows a top plan view of the embodiment shown in FIGS. 5 and 6

Referring to FIGS. 5, 6 and 7, there is shown a further alternative embodiment of the invention. The mixing device 100 comprises a base element 102 and an outer element or plate 104. The base element 102 includes a top cover 105 and a base plate 106. The base plate 106 and the outer element 104 are arranged in parallel with respect to each other.

At each of the corners of the under surface 108 of the outer element 104, there is provided a seating 110 to which a wheel or roller 112 may be journalled. At each of the corners of the top surface 114 of the base plate 106, there is provided a guide means 116 which is capable of receiving a wheel or roller 112. Each wheel or roller 112 and its corresponding guide means 116 are positioned in vertical alignment at each corner of the opposing surfaces 108 and 114 such that the wheels or rollers 112 can be accommodated within the guide means 116. The wheels 112 are dimensioned so that they can move freely within the guide means 116, thereby allowing the outer plate to undergo reciprocating movement in its own plane relative to the stationary base plate 106. Accordingly, the outer plate 104 is spaced apart from the base plate 106 by the four wheels or rollers 112.

As shown in FIGS. 5 and 6, the base element 102 houses a DC motor and a power source. The base element 102 and top cover 105 are provided with shielding means as described for previous embodiments. The output spindle of the motor is coupled to a vertically-orientated driving rod 118. The upper end of the driving rod 118 protrudes from the top cover 105 of the base element 102 and carries at its upper end an output crank shaft 120. The base plate 106 is disposed on the top cover 105 and is provided with a central aperture 107 which is dimensioned to receive the output crank shaft 120 and to accomodate the travel described by the output crank shaft 120 when the device is in use. The output crank shaft 120 is coupled at one end to a connecting rod 122 which in turn is connectable to a pin 124. The pin 124 is connectable to the under surface 108 of the top plate 104.

It will be understood that instead of being coupled to the output spindle of the DC motor, the vertically-orientated driving rod 118 could be coupled to the motor drive of a microwave oven incorporating a rotating plate.

Although not shown in the Drawings, a gearing system may be included in the drive means in order to allow an appropriate output drive rod speed to be selected for effecting reciprocating movement of the outer plate.

In use, the outer plate 104 carrying the wheels or rollers 112 on its under surface 108 is lowered onto the base plate 106 so that each of the wheels or rollers 112 is in exact vertical alignment with the corresponding guide means 116 arranged on the upper surface 114 of the base plate 106. In this position, the wheels or rollers 112 are accommodated within the guide means 116. At the same time, the top plate 104 is attached through the pin and connecting rod to the output crank shaft. The assembled mixing device may be positioned on the base of the microwave oven cavity. In embodiments in which the mixing device is to be driven by coupling to the motor of the microwave oven, the vertical drive rod must be coupled to the drive spindle of the microwave oven prior to securing the outer plate 104 in position.

When the electric motor means of the microwave oven or of the integral power unit is activated, the vertically-orientated output driving rod 118 rotates. This in turn effects the eccentric rotation of the output crank shaft 120. By virtue of the linkage arrangement of the connecting rod 122 and the pin 124, rotation of the crank shaft 120 is converted into reciprocating movement of the outer plate 104 in its own plane relative to the stationary base plate, as shown in FIG. 7. The path of the motion is determined by the wheels or rollers 112 running in the guide means 116.

A vessel (not shown) containing material to be agitated may be placed on the outer plate 104. As with the previous embodiments, the outer plate 104 may be provided with means to secure the vessel. The reciprocating movement of the outer plate 104 acts upon the liquid, semi-liquid or material or food containing a significant proportion of liquid in the vessel to agitate and mix the contents.

In embodiments having an integral power source, it is envisaged that the batteries may be rechargable and that they may be recharged from a mains adaptor or from a solar panel.

I claim:

1. A mixing device for a microwave oven, comprising:

an upper element;

a lower element;

a multiplicity of bearing members situated between said upper and lower elements;

said upper element having at least a connecting surface, a plurality of individual separated from each other bearing cups being disposed about an exterior part of said upper element and extending outwardly from said connecting surface, each said bearing cup having a limited receiving area for receiving at least a portion of the corresponding bearing element, each said receiving area being larger than the largest outside periphery of the corresponding bearing member;

said lower element having at least an attaching surface, a plurality of individual separated from each other bearing cups being disposed about an exterior part of said lower element and extending outwardly from said attaching surface, each said bearing cup of the lower element having a limited receiving area for receiving at least a portion of the corresponding bearing element, each said receiving area of the lower element being larger than the largest outside periphery of the corresponding bearing member; and a driving rod having an output crank shaft at one end thereof;

whereby in an assembled condition of said mixing device said connecting surface faces said attaching surface, so that said receiving areas of the upper element are substantially aligned with said receiving areas of the lower element forming a plurality of bearing pairs therebetween, each said bearing pair accommodates free movement therein of the corresponding bearing element, and said output crank shaft is connected to said upper element, upon rotation of said driving rod said upper element undergoes orbital motion relative to said lower element.

2. The mixing device of claim 1, wherein said driving rod is driven by an integral power source contained within the mixing device.

3. The mixing device of claim 2, wherein a shielding arrangement is provided to protect the integral power source from exposure to microwave energy within said oven.

4. The mixing device of claim 1, wherein said driving rod is energized through a gear system.

5. The mixing device of claim 1, wherein said lower element is stationary and said upper element undergoes orbital motion in a plane substantially parallel to a plane of said stationary lower element.

6. The mixing device of claim 1, wherein said lower element is releasably secured to a base of an oven cavity by a fixing arrangement.

7. The mixing device of claim 1, wherein said upper element is driven by coupling to movement of a rotating plate of the microwave oven.

8. The mixing device of claim 1, wherein said bearing members are spherical rolling contact bearings.

9. The mixing device of claim 1, wherein eccentric rotation of the crank shaft causes said orbital motion of the upper element.

10. The mixing device of claim 1, wherein said aligned receiving areas of each bearing pair accommodates said free movement therein of the corresponding bearing element.

* * * * *